(No Model.)
W. A. REDDICK.
MOLE TRAP.
No. 524,216. Patented Aug. 7, 1894.
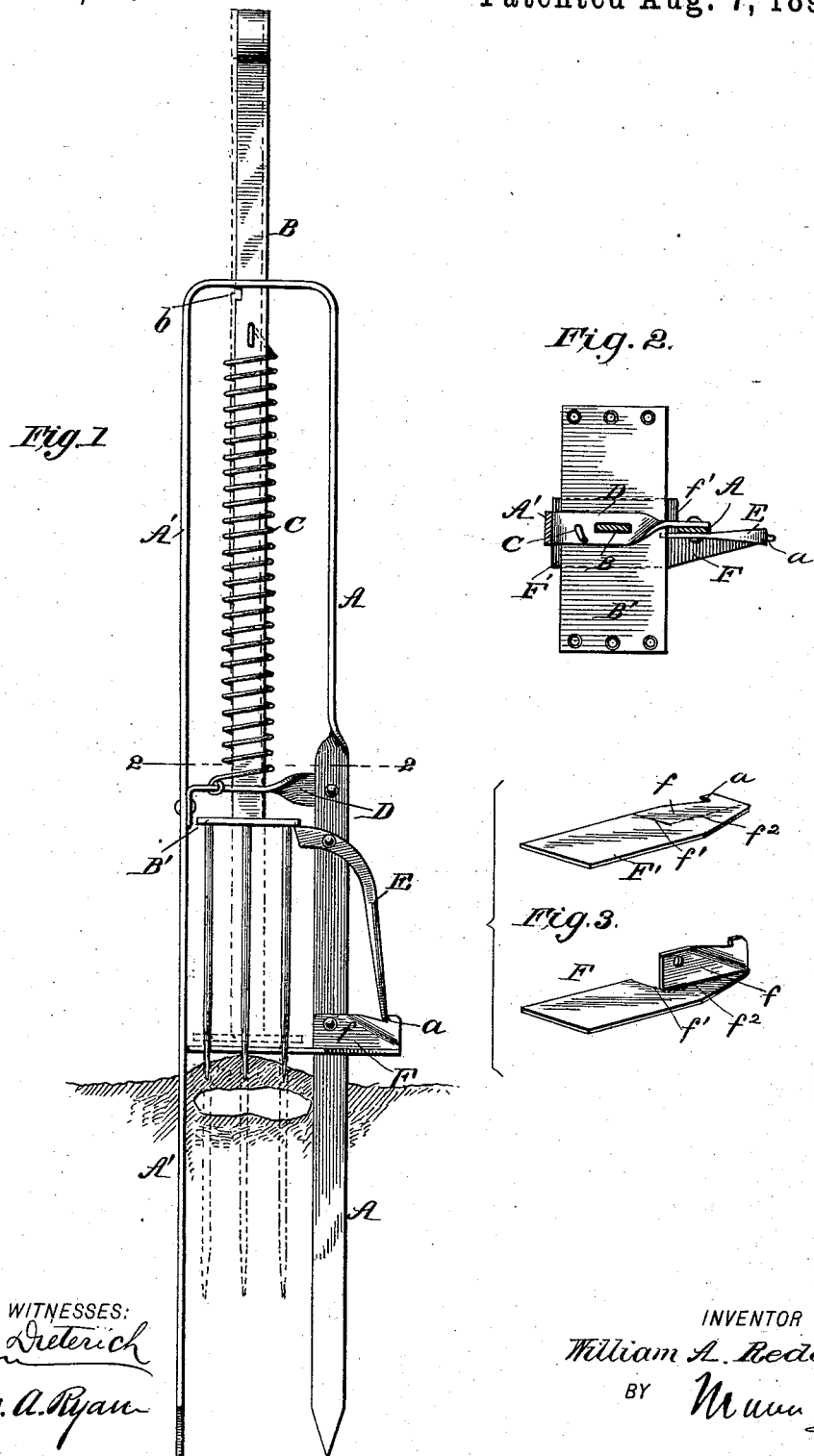
WITNESSES:
Fred G. Dieterich
Jos. A. Ryan
INVENTOR
William A. Reddick
BY
Munn & Co
ATTORNEYS.

UNITED STATES PATENT OFFICE.

WILLIAM A. REDDICK, OF NILES, MICHIGAN.

MOLE-TRAP.

SPECIFICATION forming part of Letters Patent No. 524,216, dated August 7, 1894.

Application filed May 29, 1894. Serial No. 512,847. (No model.)

*To all whom it may concern:*

Be it known that I, WILLIAM A. REDDICK, of Niles, in the county of Berrien and State of Michigan, have invented a new and useful Improvement in Mole-Traps, of which the following is a specification.

My invention relates to mole traps of that type in which a vertical frame carries a plunger rod forced downwardly by a strong spring and provided at its lower end with a cross head armed with downwardly pointed tines or spears, which plunger rod with cross head is engaged by a catch when raised or set, and is thrown by a trigger that is lifted by the mole, who is thereby caught between or impaled upon the tines.

My invention consists of several features of improvement upon this well known form of mole trap, whereby it is simply and cheaply made by machinery of a minimum quantity of material and without waste of material, and is also rendered more convenient, practical, and effective in use, as will be hereinafter fully described with reference to the drawings, in which—

Figure 1 is a side elevation, with the trap set. Fig. 2 is a cross section through line 2—2 of Fig. 1, and Fig. 3 are details of the trigger.

In the drawings, A A' represent the main frame.

B is the plunger rod bearing at its lower end a rigidly attached cross head B' with sharp downwardly pointing tines.

C is a strong spiral spring attached at one end to the plunger rod, and at the other to a cross bar D of the frame.

E is a catch lever pivoted to one of the legs of the main frame, with its upper and inner ends in range of engagement with the cross head B', so as to catch beneath the same and sustain it when raised against the tension of the spring. F is a trigger also pivoted to same leg of the main frame, and having one end extending across from one leg of the frame to the other and lying above the mole hill, while the other end is provided with a notch $a$ that catches against and holds the lower end of the catch lever E. When the two legs of the main frame are stuck down into the ground, straddling the tunnel of the mole, which is first mashed down, the mole in lifting it up again raises trigger F and releases catch lever E, and the spring then, asserting its tension, forces the cross head and tines down into the ground, impaling the mole.

This general form of mole trap is well known and in use, and I make no claim to it broadly.

In carrying out my invention I construct the two legs A A' of the main frame of one piece of flat bar steel bent parallel on itself, and just above the cross bar D one of the legs A is given a twist or quarter turn. This secures an important result, for it not only permits the whole of the frame to be made of steel bar of uniform transverse dimensions and in a single piece, but it also accomplishes the following great advantages: It stiffens the frame in both directions, for it will seen that the plane of the cross section of one leg is brought at right angles to the plane of the cross section of the other leg, which gives stiffness to said frame in both planes, and enables me to make the frame more cheaply and of much lighter material than otherwise. Furthermore it brings the plane of the leg A into such relation to the catch lever E and trigger F as to permit both of the latter devices to be pivoted to said leg so as to work in their proper planes.

The cross bar D is perforated with a hole corresponding to the cross section of the plunger rod and forms, as heretofore, a guide for the same, but said cross bar is also made of bar steel of the same dimensions as the legs of the frame, and one end of said cross bar is bent over at right angles and is riveted to one of the legs A', while the other end of said cross bar is given a twist of a quarter turn so as to bring its end flat against the twisted leg A to which it is securely riveted.

The plunger rod is guided as usual through a corresponding slot in the upper bend of the main frame, and in one edge of the plunger rod, near the top of the spiral spring, is cut a notch $b$ which, when the plunger rod is pulled up by the loop or handle at its upper end, is slipped by a sidewise movement of the plunger rod as shown in dotted lines, over the metal of the main frame at the end of the slot through the same, so as to temporarily hold the plunger rod up against the tension of the spiral spring while the catch lever and trigger are being adjusted to hold up the cross head and its tines. After said trigger and catch lever are adjusted, a sidewise movement in reverse direction is given the plunger rod which disengages its notch $b$ and renders the trap sensitive to the action of its trigger. This trigger F is formed quickly and in a cheap and practical way as follows: A broad piece of sheet steel F' is cut transversely about half way through at $f'$ and the part $f$ is then bent at right angles to the main part along the line $f^2$. This brings the part $f$ into a vertical plane parallel to the plane of the leg A to which it is pivoted, and brings the notch $a$ on its upper edge in proper relation to the catch lever, while the main part of the trigger occupies a horizontal position above the mole tunnel.

When the spear head is down to its lowest extent it rests on top of the trigger and keeps it in a proper horizontal position when the trap is thrust home into the ground. By the spear head being so close to and bearing upon the trigger when down it takes the back-thrust of the trigger when the whole trap is thrust into the ground giving the trigger a hard, firm, and level seat upon the previously soft ground so that when the spear is raised in the final act of setting the trap the trigger is left in a proper position without further arranging or attention.

Having thus described my invention, what I claim as new, and desire to secure by Letters Patent, is—

1. In a mole trap of the form described, the combination with the spring actuated plunger, having spears or tines and its trigger and catch; of a main frame composed of a flat wrought metal bar of uniform transverse dimensions bent to form parallel legs and having one of its legs twisted to a plane at right angles to the plane of the other leg and guides for directing the plunger substantially as and for the purpose described.

2. In a mole trap of the form described, the combination with the spring actuated plunger, and its trigger and catch; of a main frame composed of a flat wrought metal bar of uniform transverse dimensions bent to form parallel legs and having one of its legs twisted at right angles to the plane of the other leg, and a cross bar forming a guide for the plunger rod, and connecting the two legs of the main frame, and having one of its ends twisted to a position at right angles to the other end substantially as and for the purpose described.

3. In a mole trap of the form described, the combination with a main frame having parallel legs connected at their upper ends and having at this point an elongated slot; of a flat bar plunger rod passing through said slot and having a notch $b$ in its edge whereby the plunger bar is temporarily locked by a lateral movement substantially as and for the purpose described.

4. The combination with the main frame and the spring actuated plunger having spear head B'; of the trigger F pivoted to one of the legs and having notch $a$ in its outer end and arranged to find a bearing against the spear head when the latter is down and the catch lever E pivoted to the same leg and adapted to engage the plunger head at the upper end and the notch $a$ at its lower end substantially as shown and described.

5. The combination with the spring plunger having cross head and tines, the main frame, and the catch lever; of a trigger F consisting of a flat piece of metal having a cut and upturned flange $f$ pivoted to the main frame and provided with a notch $a$ substantially as and for the purpose described.

WILLIAM A. REDDICK.

Witnesses:
W. M. HUTTON,
H. WOODCOCK.